(12) United States Patent
Qian et al.

(10) Patent No.: US 11,365,314 B2
(45) Date of Patent: Jun. 21, 2022

(54) AQUEOUS POLYMER COMPOSITION

(71) Applicants: Dow Global Technologies LLC, Midland, MI (US); Rohm and Haas Company, Collegeville, PA (US)

(72) Inventors: Zhen Qian, Anhui (CN); Wei Cui, Shanghai (CN); Jinfei Wang, Shanghai (CN); Jianming Xu, Shanghai (CN); Jintao Liu, Shanghai (CN); Ling Li, Louyang (CN); Jingchao Zhang, Shanghai (CN)

(73) Assignees: Dow Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 297 days.

(21) Appl. No.: 16/641,307

(22) PCT Filed: Sep. 25, 2017

(86) PCT No.: PCT/CN2017/103161
§ 371 (c)(1),
(2) Date: Feb. 24, 2020

(87) PCT Pub. No.: WO2019/056361
PCT Pub. Date: Mar. 28, 2019

(65) Prior Publication Data
US 2020/0255649 A1    Aug. 13, 2020

(51) Int. Cl.
| | | |
|---|---|---|
| C09D 7/65 | (2018.01) | |
| C09D 7/63 | (2018.01) | |
| C08K 5/53 | (2006.01) | |
| C08L 43/02 | (2006.01) | |
| C08L 83/06 | (2006.01) | |
| C08K 5/5435 | (2006.01) | |

(52) U.S. Cl.
CPC .......... *C08L 43/02* (2013.01); *C08K 5/53* (2013.01); *C08K 5/5435* (2013.01); *C08L 83/06* (2013.01); *C09D 7/63* (2018.01); *C09D 7/65* (2018.01); *C08L 2201/54* (2013.01)

(58) Field of Classification Search
CPC ... C09D 7/65; C09D 7/63; C08K 5/53; C08K 5/5435; C08L 43/02; C08L 83/06; C08L 2201/54
USPC ........................................................ 524/807
See application file for complete search history.

(56) References Cited

U.S. PATENT DOCUMENTS

| | | | |
|---|---|---|---|
| 7,820,754 B2 | 10/2010 | Betremieux et al. | |
| 8,293,825 B2 | 10/2012 | Terrenoire et al. | |
| 2006/0047062 A1 | 3/2006 | Hsu et al. | |
| 2007/0105982 A1 | 5/2007 | Roschmann et al. | |
| 2011/0000658 A1* | 1/2011 | Tanaka ............... | C09D 5/1675 428/447 |

FOREIGN PATENT DOCUMENTS

| | | |
|---|---|---|
| CN | 1950408 B | 7/2011 |
| CN | 102634025 | 8/2012 |
| CN | 102037034 B | 6/2013 |
| CN | 103140555 | 6/2013 |
| EP | 2239137 | 10/2010 |
| EP | 2703434 B1 | 9/2015 |
| WO | 2009096531 | 8/2009 |
| WO | 2015157951 A1 | 10/2015 |

OTHER PUBLICATIONS

Fox, "J5. Influence of Diluent and of Copolymer Composition on the Glass Temperature of a Polymer System," Bull. Am. Physics Soc., 1956, p. 123, vol. 1, No. 3.
Peyser, "Glass Transition Temperatures of Polymers," Polymer Handbook, Interscience Publishers, p. VI/215-VI/227.
Supplementary European Search Report for the corresponding European Application No. 17925773, dated Apr. 16, 2021; 6 pages.

* cited by examiner

*Primary Examiner* — Kelechi C Egwim
(74) *Attorney, Agent, or Firm* — Cantor Colburn LLP

(57) ABSTRACT

The present invention provides an aqueous polymer composition and an aqueous coating composition comprising such aqueous polymer composition that shows balanced stain resistance, freeze-thaw stability, and anti-clogging properties.

9 Claims, No Drawings

AQUEOUS POLYMER COMPOSITION

FIELD OF THE INVENTION

The present invention relates to an aqueous polymer composition and an aqueous coating composition comprising the same, having zero or low volatile organic compounds (VOCs).

INTRODUCTION

Aqueous or waterborne coating compositions are becoming increasingly more important than solvent-based coating compositions for less environmental problems. The coating industry is always interested in developing coating compositions without or with substantially reduced or low VOCs, for example, no greater than 5 grams (g) of VOCs per liter of coating compositions. However, aqueous coating compositions, particularly low VOC coating compositions, usually suffer from a lack of freeze-thaw (F/T) stability during transportation and storage.

Recently developed anti-freeze agents having no contribution to VOCs, such as polyethylene glycol (PEG) and tristyrylphenol ethoxylate, can be used to improve F/T stability of coating compositions. For example, European Patent No. 2,703,434 discloses the use of alkoxylated tristyrylphenols or alkoxylated tributylphenols for improving freeze-thaw stability of latex dispersions and paint formulations. Unfortunately, the addition of these compounds hurts stain resistance of the resulting coatings. Some high-end applications require coatings having a total stain removal score of at least 60 as measured by the GB/T9780-2013 method. Use of phosphate surfactants has benefits of improving stain resistance properties of coatings. However, when phosphate surfactants are employed in coating compositions, increased brush clogging phenomenon has been observed. Moreover, other surfactants such as nonionic surfactants are useful for reducing brush clogging but usually compromise stain resistance performance.

Therefore, there remains a need to develop an aqueous polymer composition, particularly suitable for zero or low VOC coating applications, to balance coating performance properties including stain resistance, free-thaw stability and anti-clogging properties.

SUMMARY OF THE INVENTION

The present invention provides an aqueous polymer composition by combining a polymer comprising structural units of an allyl alkoxylated phosphate monomer, a functional silane, and a phosphate surfactant. The aqueous polymer composition can provide coating compositions comprising the same with improved balance in stain resistance, freeze-thaw stability and anti-clogging properties.

In a first aspect, the present invention is an aqueous polymer composition comprising, (i) a polymer comprising, based on the weight of the polymer, from 0.1% to 10% by weight of structural units of an allyl alkoxylated phosphate monomer having the structure of formula (I),

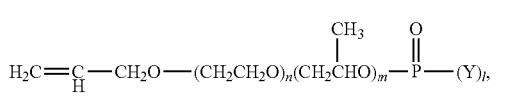

(I)

wherein m is from 2 to 5, n is from 0 to 10, l is 1 or 2, and Y is —OH or —O$^-$M$^+$, wherein M is a metal ion or ammonium ion;

(ii) a functional silane selected from an epoxy functional polysiloxane oligomers, an epoxy functional silane compound, an ethylenically unsaturated compound carrying at least one alkoxysilane functionality, or mixtures thereof; and (iii) a phosphate surfactant having the structure of formula (V),

(V)

wherein R is a $C_8$-$C_{30}$ alkyl, AO is an alkoxylated group, b is from 1 to 2, a is from 1 to 30, and N$^+$ is a metal ion or ammonium ion.

In a second aspect, the present invention is an aqueous coating composition having a VOCs content of 5 g/L or less, comprising an aqueous polymer composition of the first aspect, and at least one component selected from the group consisting of a dispersant, a coalescent, a wetting agent, a thickener, a defoamer, a pigment, and an extender.

DETAILED DESCRIPTION OF THE INVENTION

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$; all temperatures being in K. The glass transition temperatures of the homopolymers may be found, for example, in "Polymer Handbook", edited by J. Brandrup and E. H. Immergut, Interscience Publishers.

As used herein, the term structural units, also known as polymerized units, of the named monomer refers to the remnant of the monomer after polymerization, or the monomer in polymerized form. For example, a structural unit of methyl methacrylate is as illustrated:

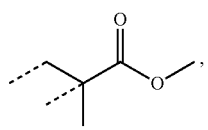

where the dotted lines represent the points of attachment of the structural unit to the polymer backbone.

The aqueous polymer composition of the present invention comprises a polymer. The polymer is obtained by free-radical polymerization, preferably emulsion polymerization (thus forming an emulsion polymer), of a mixture of monomers comprising at least one allyl alkoxylated phosphate monomer and one or more monomers described below. The polymer comprises structural units of one or more allyl alkoxylated phosphate monomers. The allyl alkoxylated phosphate monomers may have the structure of formula (I),

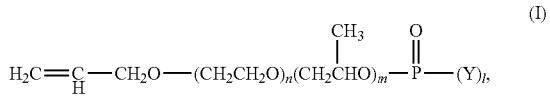

wherein, in formula (I), m is from 2 to 5, preferably from 3 to 5; n is from 0 to 10, preferably from 0 to 5; l is from 1 to 2, preferably 2; and Y is —OH or —O⁻M⁺, where M can be a metal ion or ammonium ion. Preferably, m is from 3 to 5, n is from 0 to 5, and Y is —O⁻M⁺, where M can be a metal ion or ammonium ion.

Preferably, the allyl alkoxylated phosphate monomer includes a monomer having the structure of

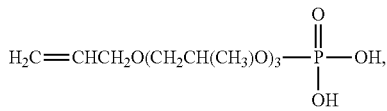

and/or a salt thereof, preferably an ammonium salt.

Suitable commercially available allyl alkoxylated phosphate monomers include ADEKA REASOAP PP-70 (allyl alkyloxylated phosphorous ester monomer with 3 propylene oxide chain) available from Adeka Company, salts thereof, or mixtures thereof.

The polymer useful in the present invention may comprise, by weight based on the weight of the polymer, 0.1% or more, 0.3% or more, 0.5% or more, 1.0% or more, or even 2% or more, and at the same time, 10% or less, 8% or less, 7% or less, 6% or less, 5% or less, or even 3% or less, of structural units of the allyl alkoxylated phosphate monomer. "Weight of the polymer" in the present invention refers to the dry or solid weight of the polymer.

The polymer useful in the present invention may also comprise structural units of one or more stabilizing monomers. The stabilizing monomers can be ethylenically unsaturated monomers carrying at least one functional group selected from carboxyl, carboxylic anhydride, sulfonic acid, amide, sulphonate, phosphonate, or combinations thereof. Examples of suitable stabilizing monomers include α, β-ethylenically unsaturated carboxylic acids including an acid-bearing monomer such as methacrylic acid (MAA), acrylic acid (AA), itaconic acid (IA), maleic acid, or fumaric acid; or a monomer bearing an acid-forming group which yields or is subsequently convertible to, such an acid group (e.g., anhydride, (meth)acrylic anhydride, or maleic anhydride); sodium styrene sulfonate (SSS), sodium vinyl sulfonate (SVS), 2-acrylamido-2-methylpropanesulfonic acid (AMPS), ammonium salt of 2-acrylamido-2-methyl-1-propane sulfonic acid, sodium salt of allyl ether sulfonate, and the like; acrylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide; or mixtures thereof. Preferred stabilizing monomers include α, β-ethylenically unsaturated carboxylic acids such as methacrylic acid, acrylic acid, or mixtures thereof. The polymer may comprise, by weight based on the weight of the polymer, from 0 or more, 0.5% or more, 1% or more, or even 1.5% or more, and at the same time, 5% or less, 3% or less, or even 2.5% or less, of structural units of the stabilizing monomer.

The polymer useful in the present invention may further comprise structural units of one or more ethylenically unsaturated alkoxylated (meth)acrylate monomers. The ethylenically unsaturated alkoxylated (meth)acrylate monomers may have the structure of formula (II),

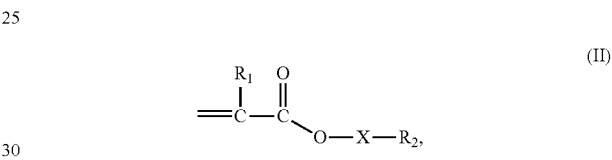

wherein $R_1$ is a hydrogen atom or a methyl group, X is a divalent organic polyalkylene oxide group comprising from 1 to 50 alkylene oxide units, and $R_2$ is a hydrogen atom or an aliphatic or aromatic hydrocarbon group having 1 to 20 carbon atoms. In one embodiment, X is preferably a polyalkylene oxide group comprising ethylene oxide (EO) units, propylene oxide (PO) units, or a combination of ethylene oxide and propylene oxide units. Ethylene oxide units and propylene oxide units may alternate, for example, or may be present in the form of polyethylene oxide and/or polypropylene oxide blocks. The polyalkylene oxide group may comprise 1 or more, 2 or more, 3 or more, or even 4 or more, and the same times, 50 or less, 40 or less, 30 or less, or even 20 or less of the alkylene oxide units. The radical $R_2$ is preferably a hydrogen atom or a hydrocarbon group having 1 to 10 carbon atoms; preferably, $R_2$ is a $C_1$-$C_8$ alkyl group, a $C_1$-$C_4$ alkyl group, or a hydrogen atom. Suitable commercially available ethylenically unsaturated alkoxylated (meth)acrylate monomers include VISIOMER MPEG-1005MA (methoxy polyethylene glycol 1000 methacrylate) available from Evonik Company. The polymer may comprise, by weight based on the weight of the polymer, 0 or more, 0.1% or more, 0.5% or more, 0.8% or more, 1% or more, 1.5% or more, or even 3% or more, and at the same time, 5% or less, 4% or less, 3% or less, 2.5% or less, or even 2% or less, of structural units of the ethylenically unsaturated alkoxylated (meth)acrylate monomer.

The polymer useful in the present invention may also comprise structural units of one or more ethylenically unsaturated monomers carrying at least one functional group (hereinafter "functional-group-containing ethylenically unsaturated monomer") that are different from the stabilizing monomer. The functional groups may be selected from a carbonyl, acetoacetoxy, acetoacetamide, ureido, imide, amino, hydroxyl, alkoxysilane, or phosphorous group. When the functional group is the alkoxysilane group, the functional-group-containing ethylenically unsaturated monomers include the ethylenically unsaturated compounds carrying at least one alkoxysilane functionality described in the functional silane section below. Examples of suitable functional-group-containing ethylenically unsaturated monomers include vinyltrialkoxysilanes such as vinyltrimethoxysilane or (meth)acryloxyalkyltrialkoxysilanes; acetoacetoxyethyl methacrylate (AAEM); vinyl phosphonic acid, allyl phosphonic acid, phosphoalkyl (meth)acrylates such as phosphoethyl (meth)acrylate, phosphopropyl (meth) acrylate, phosphobutyl (meth)acrylate, or salts thereof; diacetone acrylamide (DAAM), methylacrylamidoethyl ethylene urea, hydroxy-functional (meth)acrylic acid alkyl ester such as hydroxyethyl methacrylate and hydroxypropyl methacrylate, or mixtures thereof. Preferred functional-group-containing ethylenically unsaturated monomers are selected from acetoacetoxyethyl methacrylate, diacetone acrylamide or mixtures thereof. The polymer may comprise, by weight based on the weight of the polymer, 0 or more, 0.1% or more, 0.5% or more, 1% or more, 1.5% or more, 2% or more, 2.5% or more, or even 3% or more, and at the same time, 10% or less, 8% or less, or even 5% or less of structural units of the functional-group-containing ethylenically unsaturated monomer.

The polymer useful in the present invention may also comprise structural units of one or more additional ethylenically unsaturated nonionic monomers that are different from the monomers described above. As used herein, the term "nonionic monomers" refers to monomers that do not bear an ionic charge between pH=1-14. Suitable ethylenically unsaturated nonionic monomers may include, for example, monoethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, (meth)acrylonitrile, or mixtures thereof. Preferably, the additional ethylenically unsaturated nonionic monomers are selected from the group consisting of methyl methacrylate, ethyl acrylate, butyl acrylate, 2-ethylhexyl acrylate, and styrene. The polymer may comprise, by weight based on the weight of the polymer, from 75% to 99.3%, from 80% to 95%, or from 87% to 94%, of structural units of the additional ethylenically unsaturated nonionic monomers.

In some embodiments, the polymer comprises, by weight based on the weight of the polymer, from 0.1% to 5% of structural units of the allyl alkoxylated phosphate monomer, from 0.5% to 3% of structural units of the stabilizing monomer, from 0.1% to 5% of structural units of the ethylenically unsaturated alkoxylated (meth)acrylate monomer, and from 87% to 99.3% of structural units of the additional ethylenically unsaturated nonionic monomer including, for example, alkyl esters of (methyl) acrylic acids such as methyl methacrylate, ethyl acrylate, butyl acrylate, 2-ethylhexyl acrylate, or mixtures thereof.

The types and levels of the monomers described above for preparing the polymer may be chosen to provide the polymer with a glass transition temperature (Tg) of −10° C. or more, 0° C. or more, 10° C. or more, 20° C. or more, or even 30° C. or more, and at the same time, 70° C. or less, 60° C. or less, 50° C. or less, or even 40° C. or less. Tgs of the polymers may be calculated herein by using the Fox equation described above.

The aqueous polymer composition of the present invention may further comprise one or more functional silanes selected from an epoxy functional polysiloxane oligomer, an epoxy functional silane compound, an ethylenically unsaturated compound carrying at least one alkoxysilane functionality, or mixtures thereof. In some embodiments, the aqueous polymer composition of the present invention comprises the epoxy functional polysiloxane oligomer.

The aqueous polymer composition of the present invention may comprise one or more epoxy functional polysiloxane oligomers, typically saturated epoxy functional polysiloxane oligomers. "Oligomer" herein refers to a polymer having a number-average molecular weight of from 200 to 3,000, from 300 to 2,000, or from 350 to 1,000. The number-average molecular weight (Mn) of the epoxy functional polysiloxane oligomers can be measured by gel permeation chromatography (GPC) using an Agilent 1200. A sample is dissolved in tetrahydrofuran (THF) with a concentration of 5 mg/mL and then filtered through 0.45 μm polytetrafluoroethylene (PTFE) filter prior to the GPC analysis. Conditions for the GPC analysis are as follows, Column: One PLgel GUARD columns (10 μm, 50×7.5 mm), two Polymer Laboratories Mixed E columns (7.8×300 mm) in tandem; column temperature: 40° C.; mobile phase: THF; flow rate: 1.0 mL/minute; Injection volume: 50 L; detector: Agilent Refractive Index detector, 40° C.; and calibration curve: PL Polystyrene Narrow standards with molecular weights ranging from 580 to 19760 g/mol, using polynom 3 fitness. The peak molecular weight (Mp) used for narrow calibration is values converted from Mp of each PS standard using following equation: $M_p=1.0951$ Mp of $PS^{0.9369}$.

The epoxy functional polysiloxane oligomers useful in the present invention may have the structure of formula (III):

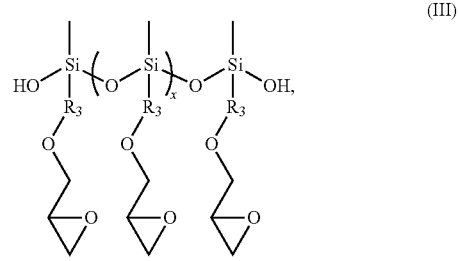

where x is from 0 to 14; preferably, from 0 to 4, from 1 to 4, or from 1 to 3; and $R_3$ is —$CH_2CH_2CH_2$—.

The epoxy functional polysiloxane oligomer can be a mixture of oligomers having the structure of formula (III) with different x values, for example, 0, 1, 2 or 3. In one embodiment, the epoxy-containing polysiloxane oligomer useful in the present invention comprises, (i) a polysiloxane of formula (III), wherein p=0; (ii) a polysiloxane of formula (III), wherein p=1; (iii) a polysiloxane of formula (III), wherein p=2; and (iv) a polysiloxane of formula (III), wherein p=3. Suitable commercially available epoxy functional polysiloxane oligomers may include CoatOSil MP 200 polysiloxane oligomer available from Momentive Performance Materials Inc.

The aqueous polymer composition of the present invention may comprise one or more epoxy functional silane compounds that are different from the epoxy functional polysiloxane oligomer. The epoxy functional silane compound is typically a saturated alkoxylated silane having an epoxy group. The epoxy functional silane compound may have at least one hydrolysable silane group. A preferred epoxy functional silane compound has the general formula (IV):

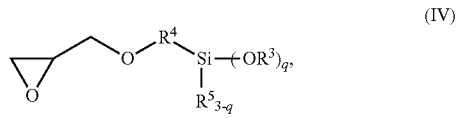

(IV)

where $R^3$ represents an alkyl group having one to 6 carbon atoms; $OR^3$ group represents an alkoxy group including, for example, methoxy, ethoxy or acetoxy group, or combinations thereof; $R^4$ represents a bivalent organic group having a molecular weight of 200 or less, preferably, $R^4$ is a $C_1$-$C_{10}$, $C_1$-$C_5$, or $C_1$-$C_3$ alkylene group; $R^5$ represents a hydrogen atom or an alkyl, aryl, or aralkyl group having one to 20 carbon atoms; and q is one, 2 or 3. Examples of suitable epoxy functional silane compounds may include 3-glycidyloxypropyl trimethoxysilane, 3-glycidyloxypropyl triethoxysilane, 3-glycidyloxypropyl methyldiethoxysilane, 3-glycidyloxypropyl methyldimethoxysilane, or mixtures thereof. Suitable commercially available epoxy functional silane compounds may include Silquest A-187 gamma-glycidoxypropyltrimethoxysilane from Momentive Performance Materials Inc.

The aqueous polymer composition of the present invention may comprise one or more ethylenically unsaturated compounds carrying at least one alkoxysilane functionality (hereinafter "unsaturated alkoxysilane functional compound") that are different from the epoxy functional silane compound. The unsaturated alkoxysilane functional compound preferably carries a hydrolyzable alkoxysilane functionality. Suitable unsaturated alkoxysilane functional compounds include, for example, vinyltrialkoxysilanes such as vinyltrimethoxysilane; alkylvinyldialkoxysilanes; (meth) acryloxyalkyltrialkoxysilanes such as (meth)acryloxyethyltrimethoxysilane and (meth)acryloxypropyltrimethoxysilane; derivatives thereof, and combinations thereof.

The functional silane (i.e., the epoxy functional polysiloxane oligomer, the epoxy functional silane compound, and/or unsaturated alkoxysilane functional compound) useful in the present invention may be present in a combined amount of 0.05% or more, 0.1% or more, 0.15% or more, 0.2% or more, 0.25% or more, 0.3% or more, 0.4% or more, or even 0.5% or more, and at the same time, 3% or less, 2.5% or less, 2% or less, 1.5% or less, or even 1% or less, by weight based on the weight of the polymer.

The aqueous polymer composition of the present invention also comprises one or more phosphate surfactants having the structure of formula (V),

(V)

wherein R is a $C_8$-$C_{30}$ alkyl, AO is an alkoxylated group (i.e., alkylene oxide), b is from 1 to 2, a is from 1 to 30, and $N^+$ can be a metal ion or ammonium ion. R can be a $C_8$-$C_{18}$ alkyl, preferably $C_{10}$-$C_{15}$ alkyl, and more preferably a $C_{11}$-$C_{13}$ alkyl. AO can be an ethoxylated group (i.e., ethylene oxide group), a propoxylated group (i.e., propylene oxide group), or combinations thereof, preferably an ethoxylated group. Preferably, the value of a in formula (V) is from 1 to 30, from 3 to 15, or from 5 to 10. Preferably, b is 2. Suitable commercially available phosphate surfactants may include, for example, RHODAFAC RS610 alkyl ethoxylated phosphate surfactant with 6 ethylene oxide units available from Solvay Company. The phosphate surfactant may be added into the mixture of monomers used for preparing the polymer, during polymerization, after polymerization, or combinations thereof. The aqueous polymer composition of the present invention may comprise, by weight based on the weight of the polymer, 0.1% or more, 0.3% or more, 0.5% or more, 1% or more, 2% or more, 2.5% or more, or even 3% or more, and at the same time, 5% or less, 4.5% or less, 4% or less, or even 3.5% or less, of the phosphate surfactant. The weight ratio of the phosphate surfactant to the allyl alkoxylated phosphate monomer used for preparing the polymer may range from 5:95 to 95:5, from 10:90 to 90:10, from 30:70 to 70:30, from 40:60 to 50:50, preferably, from 5:95 to 50:50.

The aqueous polymer composition of the present invention may be prepared by: first forming the polymer by free-radical polymerization, preferably emulsion polymerization, of a mixture of monomers comprising the allyl alkoxylated phosphate monomer and one or more monomers described above. Total weight concentration of the mixture of monomers described above for preparing the polymer is equal to 100%. The mixture of monomers may be added neat or as an emulsion in water; or added in one or more additions or continuously, linearly or nonlinearly, over the reaction period of preparing the polymer. Temperature suitable for free-radical polymerization process may be lower than 100° C., in the range of from 30° C. to 95° C., or in the range of from 50° C. to 90° C. One or more surfactants may be used in preparing the polymer. The surfactant may include the phosphate surfactant described above, an additional surfactant that is different from the phosphate surfactant, or combinations thereof. The phosphate surfactant and/or additional surfactant may be added prior to, during, or after the polymerization of the monomer mixture, or combinations thereof. These additional surfactants may include anionic and/or nonionic emulsifiers. Examples of suitable additional surfactants include DISPONIL FES 32 fatty alcohol ether sulfate available from BASF, TERGITOL™ 15-S-40 secondary alcohol ethoxylate available from Dow Chemical Company (TERGITOL is a trademark of The Dow Chemical Company). The additional surfactant used is usually from 0 to 5% by weight, from 0.5% to 3%, or from 0.8% to 2% by weight, based on the total weight of monomers used for preparing the polymer. The functional silane may be added after the polymerization of the monomer mixture.

In the polymerization process, free radical initiators and/or chain transfer agents may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the polymer, for example, from 0 to 1%, from 0.1% to 0.5%, or from 0.15% to 0.4%, by weight based on the total weight of monomers used for preparing the polymer.

After completing the polymerization, the obtained polymer dispersion may be neutralized by one or more bases as neutralizers to a pH value, for example, at least 6, from 6 to 10, or from 7 to 9. The bases may lead to partial or complete neutralization of the ionic or latently ionic groups of the polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The polymer useful in the present invention may have an average particle size of from 50 nanometers (nm) to 500 nm, from 80 nm to 200 nm, or from 90 nm to 150 nm, as measured by a Brookhaven BI-90 or 90Plus Particle Sizer.

The aqueous polymer composition of the present invention is particularly useful for zero or low VOCs coating applications where stain resistance, F/T stability and anticlogging properties are desired. The aqueous coating composition of the present invention comprising the aqueous polymer composition has zero or low VOCs, that is, no greater than 5 grams of volatile organic compounds (VOCs) per liter (g/L) of the aqueous coating composition according to the GB18582-2008 method. Preferably, the VOC content of the aqueous coating composition is less than 5 g/L, less than 3 g/L, less than 2.5 g/L, less than 2 g/L, or less than 1 g/L. Surprisingly, the aqueous coating composition of the present invention can also provide coating films with surprisingly improved stain resistance as indicated by a total stain removal score of at least 60 according to the GB/T 9780-2013 method, while the aqueous coating composition also has good freeze-thaw stability and good anti-clogging properties according to the test methods described in the Examples section. "Good freeze-thaw stability" (that is, being freeze-thaw stable) means that a composition can be subjected to three freeze-thaw cycles (from −6° C. to room temperature) showing no coagulation and/or agglomeration, according to the test method described in the Examples section below. The GB 18582-2008 method herein is the national standard for indoor decorating and refurbishing materials-limit of harmful substances of interior architectural coatings, which was issued on April 1, 2008 and put into effect on Oct. 1, 2008. The GB/T 9780-2013 method herein is the national standard for test method for dirt pickup resistance and stain removal of films of architectural coatings and paints, which was issued on Nov. 27, 2013 and put into effect on Aug. 1, 2014. The GB/T9780-2013 and GB 18582-2008 methods were both published by General Administration of Quality Supervision, Inspection and Quarantine of the P. R. China and Standardization Administration of the P. R. China.

The aqueous coating composition of the present invention may also comprise one or more pigments and/or extenders. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. $TiO_2$ may be also available in concentrated dispersion form. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 30% to 70%, from 40% to 60%, or from 45% to 55%. PVC of a coating composition may be determined according to the following equation:

$$PVC = \frac{\text{volume of pigment}(s) + \text{volume of extender}(s)}{\text{total dry volume of coating composition}} * 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, by weight based on the total weight of the aqueous coating composition, in an amount of generally from 0 to 0.5%, from 0.05% to 0.4%, or from 0.1% to 0.3%.

The aqueous coating composition of the present invention may further comprise one or more thickeners, also known as "rheology modifiers". The thickeners may include polyvinyl alcohol (PVA), acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is selected from HASE, HEC, HEUR, or mixtures thereof. The thickener may be present, by weight based on the total weight of the aqueous coating composition, in an amount of generally from 0 to 3.0%, from 0.1% to 1.5%, or from 0.2% to 1.2%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, TRITON™ CF-10 nonionic surfactant available from The Dow Chemical Company (TRITON is a trademark of The Dow Chemical Company), SURFYNOL 10 nonionic wetting agent based on an actacetylenic diol available from Air Products, BYK-346 and BYK-349 polyether-modified siloxanes both available from BYK, or mixtures thereof. The wetting agent may be present, by weight based on the total weight of the aqueous coating composition, in an amount of from 0 to 1.0%, from 0.1% to 0.8%, or from 0.2% to 0.6%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include TEXANOL ester alcohol available from Eastman Chemical Company, Coasol and Coasol 290 Plus coalescents available from Chemoxy International Ltd., dipropylene glycol n-butyl ether, ethylene glycol monobutyl ether, diethylene glycol monobutyl ether, n-butyl ether, or mixtures thereof. The coalescent may be present, by weight based on the total weight of the aqueous coating composition, in an amount of from 0 to 3.0%, from 0.1% to 2.0%, or from 0.2% to 1.5%.

The aqueous coating composition of the present invention may further comprise one or more dispersants. The dispersants may include non-ionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids (e.g., molecular weight ranging from 1,000 to 50,000 as measured by GPC), including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The dispersant may be present, by weight based on the total weight of the aqueous coating composition, in an amount of from 0 to 1.0%, from 0.1% to 0.8%, or from 0.2% to 0.6%.

The aqueous coating composition of the present invention may comprise one or more anti-freeze agents without contributing VOCs. Specific examples of anti-freeze agents may include polyethylene glycol, RHODOLINE FT-100 freeze thaw stabilizer available from Solvay, or mixtures thereof. The anti-freeze agent, if present, should be in an amount without compromising stain resistance of coatings made therefrom, e.g., up to 0.5%, up to 0.4%, or up to 0.1%, of the anti-freeze agent, by weight based on the total weight of the aqueous coating composition. Preferably, the aqueous coating composition is substantially free of the anti-freeze agents (e.g., less than 0.1% or even less than 0.05%).

In addition to the components described above, the aqueous coating composition of the present invention may further comprise any one or combination of the following additives: buffers, neutralizers, humectants, mildewcides, biocides, anti-skinning agents, colorants, flowing agents, crosslinkers, anti-oxidants, plasticizers, leveling agents, thixotropic agents, adhesion promoters, and grind vehicles. These additives may be present in a combined amount of from 0 to 1% or from 0.1% to 0.8%, by weight based on the total weight of the aqueous coating composition.

The aqueous coating composition of the present invention may further comprise water typically present in an amount of from 30% to 90%, from 40% to 80%, or from 50% to 70%, by weight based on the total weight of the aqueous coating composition.

The aqueous coating composition of the present invention may be prepared by admixing the aqueous polymer composition and at least one component selected from the group consisting of a dispersant, a coalescent, a wetting agent, a thickener, a defoamer, a pigment, and an extender. Components in the aqueous coating composition may be mixed in any order to provide the aqueous coating composition of the present invention. Any of the above-mentioned optional components may also be added to the composition during or prior to the mixing to form the aqueous coating composition. The pigments and/or extenders are preferably mixed with the dispersant to form a slurry of pigments and/or extender.

The aqueous coating composition of the present invention can be applied to, and adhered to, various substrates. Examples of suitable substrates include wood, metals, plastics, foams, stones, elastomeric substrates, glass, wall paper, fabrics, medium-density fiberboard (MDF), particle board, gypsum board, concrete, or cementious substrates. The aqueous coating composition can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the coating composition can dry, or allow to dry, to form a film (this is, coating) at room temperature (20-25° C.), or at an elevated temperature, for example, from 35° C. to 60° C. The coating composition can be used alone, or in combination with other coatings to form multi-layer coatings.

The aqueous coating composition of the present invention are useful as coatings on various substrates, where good beading effect and good stain resistance are important, such as those surfaces which are routinely exposed to the outdoors. The aqueous coating composition is suitable for various applications such as marine and protective coatings, automotive coatings, traffic paint, Exterior Insulation and Finish Systems (EIFS), roof mastic, wood coatings, coil coatings, plastic coatings, can coatings, architectural coatings, and civil engineering coatings. The aqueous coating composition is particularly useful for architectural coatings.

EXAMPLES

Some embodiments of the invention will now be described in the following Examples, wherein all parts and percentages are by weight unless otherwise specified.

Butyl acrylate (BA), methacrylic acid (MAA), ethyl acrylate (EA), 2-Ethylhexyl acrylate (2-EHA), methyl methacrylate (MMA), monoethanolamine (MEA), and TERGITOL 15-s-40 nonionic surfactant ("15-s-40") are all available from The Dow Chemical Company.

DISPONIL FES 32 surfactant ("Fes-32") is fatty alcohol ether sulfate.

DISPONIL A-19 IS surfactant ("A-19") is sodium dodecyl (Linear) benzene sulfonate. These two surfactants are both available from BASF.

ADEKA REASOAP SR-1025 surfactant ("SR-1025"), available from Adeka, is an anionic polymerizable emulsifier (25% active).

HITENOL AR-1025 surfactant ("AR-1025"), available from Dai-Ichi Kogyo Seiyaku Co., Ltd., is polyoxyethylene styrenated propenyl phenyl ether sulfate ammonium salt (25% active).

VISIOMER MPEG 1005 MA ("MPEG-1005MA"), available from The Evonik Company, is a polyalkylene oxide lauryl methacrylate.

Polystep P-12A surfactant ("P-12A"), available from Stepan, is polyethylene glycol monotridecyl ether phosphate (25% active).

RHODAFAC PE3016 surfactant ("PE3016"), available from Solvay, is an alkoxylated phosphate ester surfactant.

CoatOSil MP 200 silane ("MP200") is an epoxy functional polysiloxane oligomer having a number-average molecular weight of from 350 to 1,000. Silquest A-171 silane ("A-171") is vinyltrimethoxysilane. Silquest A-187 silane ("A-187") is gamma-Glycidoxypropyltrimethoxysilane. MP200, A-171, A-187 silanes are all available from Momentive Performance Materials Inc.

Phosphoethyl methacrylate (PEM) is available from Solvay (100% active).

PP-7025, available from Shanghai Yuyou Industrial Co., Ltd., is poly[oxy(methyl-1,2-ethanediyl)], .alpha.-2-propenyl-,omega,-hydroxy,-phosphate ammonium salt (25% active). SIPOMER PAM-200 ("PAM-200"), available from Solvay, is methylacrylate alkoxylated ether phosphate containing ~5 PO units (100% active). SIPOMER COPS-3 ("COPS-3"), available from Solvay, is an allyl alkoxylated ether phosphate ammonium salt (40% active). UCAN-5, UCAN-6, UCAN-7 and UCAN-9 allyl alkoxylated ether phosphate ammonium salts are all available from Shanghai Honesty Fine Chemical Co., Ltd. The structure of these surfactants is given as follows,

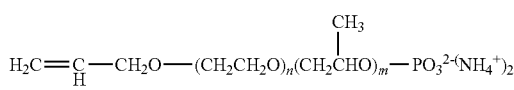

| Sample name | n | m |
|---|---|---|
| PP-7025 | 0 | 3 |
| UCAN-5 | 0 | 5 |
| UCAN-6 | 5 | 0 |
| UCAN-7 | 4 | 5 |
| COPS-3 | 4 | 0 |
| UCAN-9 | 0 | 8 |

The following standard analytical equipment and methods are used in the Examples.

Freeze/Thaw (F/T) Stability Evaluation

Containers were filled with 75% volume of a test coating composition. The containers were sealed and placed into a freezer at −6° C. for 16 hours, and then taken out from the freezer to allow to thaw at ambient conditions (about 25° C.) for 8 hours. The above steps complete one F/T cycle. The F/T cycles were continued until the sample coagulated or to a maximum of three cycles. After each cycle, the cycle number was recorded if coagulation or gel had been observed. After the completion of 3 cycles, the sample was shaken manually to observe the appearance by the naked eye. If the sample does not coagulate or shows no grits separated from the sample after the freeze-thaw test, the sample is rated as "Pass" indicating good freeze-thaw stability. Otherwise, if the sample coagulates or has grits separated, the sample is rated as "Fail" indicating poor freeze-thaw stability.

Brush Clogging Test

A test sample was prepared by mixing 100 g of a test coating composition and 20 g of water. The resultant mixture was poured into a can. Next, a woolen brush was placed into the can which was then put in an oven at 40° C. for 2 hours. The heated brush was taken out and brushed on a board, and then was placed back into the can which was stored in the oven. The above steps complete one cycle. At every cycle, the cycle number is recorded if brush clogging has been observed. After 5 cycles, the brush was gently washed by hand using water. If the brush is not clogged or hardened and there is no precipitation observed inside the brush, the sample passes the brush clogging test, indicating good anti-clogging performance; otherwise, the sample fails the brush clogging test, indicating poor anti-clogging performance.

Stain Removal Test

Stain removal ability was tested by using the GB/T 9780-2013 method. Test samples were casted on black vinyl scrub charts using a drawdown bar to form wet films (thickness: 120 μm). The films were cured for 7 days at room temperature before stains were applied. Test areas consist of 25 mm wide and 100 mm length of the chart cross section. Within the test area, six types of stains (vinegar, black tea, ink, water black, alcohol black, and Vaseline black) were applied on the films. Liquid stains were applied over gauze to prevent the stain from running off from the test area. Stains stayed on the panel for 2 hours before excess stain was wiped off with dry tissue. The test panel was then placed on a scrub tester under a 1.5 kg weight, with a scrubbing cycle of 37 scrubs per minute. After the test panel was scrubbed for 200 cycles, it was removed from the tester, rinsed under running water, and hung up for drying. Then the cleaned stain area was evaluated by measuring the change of reflection index (X) using the formula below, $$X = \frac{Y_1}{Y_0} \times 100$$

where $Y_1$ is reflection index after the stain removal test and $Y_0$ is reflection index before the stain removal test. $Y_1$ and $Y_0$ were tested by BYK spectro-guide instrument.

Based on the obtained reflection index value X, the stain removal score (Ri) for each stain, on a scale of 1 to 10, can be obtained from the below table,

| R | vinegar | black tea | ink | water black | alcohol black | Vaseline black |
|---|---|---|---|---|---|---|
| 10 | 99 < X ≤ 100 | 98 < X ≤ 100 | 96 < X ≤ 100 | 96 < X ≤ 100 | 95 < X ≤ 100 | 99 < X ≤ 100 |
| 9 | 98 < X ≤ 99 | 95 < X ≤ 98 | 91 < X ≤ 96 | 91 < X ≤ 96 | 89 < X ≤ 95 | 98 < X ≤ 99 |
| 8 | 97 < X ≤ 98 | 91 < X ≤ 95 | 85 < X ≤ 91 | 85 < X ≤ 91 | 82 < X ≤ 89 | 97 < X ≤ 98 |
| 7 | 96 < X ≤ 97 | 86 < X ≤ 91 | 78 < X ≤ 85 | 78 < X ≤ 85 | 74 < X ≤ 82 | 96 < X ≤ 97 |
| 6 | 95 < X ≤ 96 | 80 < X ≤ 86 | 70 < X ≤ 78 | 70 < X ≤ 78 | 65 < X ≤ 74 | 95 < X ≤ 96 |
| 5 | 93 < X ≤ 95 | 73 < X ≤ 80 | 61 < X ≤ 70 | 61 < X ≤ 70 | 55 < X ≤ 65 | 93 < X ≤ 95 |
| 4 | 90 < X ≤ 93 | 65 < X ≤ 73 | 51 < X ≤ 61 | 51 < X ≤ 61 | 44 < X ≤ 55 | 90 < X ≤ 93 |
| 3 | 86 < X ≤ 90 | 56 < X ≤ 65 | 40 < X ≤ 51 | 40 < X ≤ 51 | 32 < X ≤ 44 | 86 < X ≤ 90 |
| 2 | 81 < X ≤ 86 | 46 < X ≤ 56 | 28 < X ≤ 40 | 28 < X ≤ 40 | 19 < X ≤ 32 | 81 < X ≤ 86 |
| 1 | X ≤ 81 | X ≤ 46 | X ≤ 28 | X ≤ 28 | X ≤ 19 | X ≤ 81 |
| Total | | | | | | 1000.0 |

The total stain removal score (R') was Then calculated according to the formula below, $$R' = \frac{\sum_{i=1}^{n=6} R_i}{n} \times 10.$$

where Ri is the stain removal score for different stains and n is 6. In China, the premium standard of stain removal is at least 60 points according to the GB method. Otherwise, the total stain removal score less than 60 points is not acceptable. The higher the total stain removal score, the better stain resistance.

VOCs Measurement

The VOCs measurement was performed on an Agilent 7890A Gas Chromatograph (GC), 5975C mass spectrometer (MS) with a triple-axis detector. An aliquot of 2 g (recorded accurately) of the test coating composition was weighed into a 20 mL centrifuge vial, followed by adding 500 ppm an internal standard (2-(2-ethoxyethoxy)-ethanol) and a VOC marker (hexanedioic acid, diethyl ester). The resultant sample was first shaken on a vortex mixer for 1 minute, followed by standing for 5 minutes, then shaken for another 1 minute, and finally then centrifuged at 4,000 rpm for 20 minutes. The supernatant of the sample was taken out and filtered through a 0.45 μm syringe filter. The resultant filtration was then injected into the GC-MS system with an injection volume of 1 μL. GC-MS conditions were as follows, GC oven program: Initial 45° C. holding for 4 minutes, and then at a rate of 8° C./min to 230° C. holding for 10 minutes; flow rate: 1 mL/min; average velocity: 36.4 cm/sec;

GC Inlet temperature: 230° C., Split ratio: 10:1;

GC Column: DB-5MS (J&W, part number: 122-5533): 30 m length×250 μm diameter×1.0 μm film thickness;

Mass Spectrometry Detector (MSD) parameters (scan mode): MS Source temperature: 230° C., MS Quad temperature: 150° C., Acquire Mode: Scan, Mass 29-350 Da.

The content of VOCs in the sample was measured based on the guidelines described in the GB 18582-2008 method. The response factors of various VOCs to the internal standard were regarded as '1'.

Comparative (Comp) Example (Ex) 1 Aqueous Polymer Composition

A monomer emulsion (ME) was prepared by mixing 450 g of DI water, 60 g of A-19, 60 g of PP-7025, 712.58 g of MMA, 109.42 g of 2-EHA, 721.21 g of EA, and 23.76 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.0 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate in 100 g DI water in 120 minutes. When the ME feed was completed, the reaction was maintained at 88° C. for 40 minutes. Then NaOH solution was added to adjust the pH to 8.0-8.5. At last, 8.20 g of CoatOSil MP200 silane oligomer were post added slowly.

Comp Ex 2 Aqueous Polymer Composition

A monomer emulsion (ME) was prepared by mixing 450 g of DI water, 60 g of P-12A, 697.17 g of MMA, 109.42 g of 2-EHA, 721.21 g of EA, 22.29 g of MPEG-1005MA and 16.97 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.0 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate dissolved in 100 g of DI water in 120 minutes. When the ME feed was completed, the reaction was maintained at 88° C. for 40 minutes. Then NaOH solution was added to adjust the pH to 8.0-8.5. At last, 8.20 g of CoatOSil MP200 silane oligomer were post added slowly.

Ex 1 Aqueous Polymer Composition

A monomer emulsion (ME) was prepared by mixing 450 g of deionized (DI) water, 60 g of P-12A, 60 g of PP-7025, 697.17 g of MMA, 109.42 g of 2-EHA, 721.21 g of EA, 22.29 g of MPEG-1005MA and 16.97 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.00 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate in 100 g of DI water in 120 minutes. When the ME feed was completed, the reaction was maintained at 88° C. for 40 minutes. Then NaOH solution was added to adjust the pH to 8.0-8.5. At last, 8.20 g of CoatOSil MP200 silane oligomer were post added slowly.

Comp Ex 3 Aqueous Polymer Composition

A monomer emulsion (ME) was prepared by mixing 450 g of DI water, 100 g of PE3016, 697.17 g of MMA, 109.42 g of 2-EHA, 721.21 g of EA, 22.29 g of MPEG-1005MA and 16.97 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.0 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate dissolved in 100 g of DI water in 120 minutes. When the ME feed was completed, the reaction was maintained at 88° C. for 40 minutes. Then NaOH solution was added to adjust the pH to 8.0-8.5. At last, 8.20 g of CoatOSil MP200 silane oligomer were post added slowly.

Comp Ex 4 Aqueous Polymer Composition

A monomer emulsion (ME) was prepared by mixing 450 g of DI water, 60 g of P-12A, 60 g of SR-1025, 697.17 g of MMA, 109.42 g of 2-EHA, 721.21 g of EA, 22.29 g of MPEG-1005MA and 16.97 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.0 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate dissolved in 100 g of DI water in 120 minutes. When the ME feed was completed, the reaction was maintained at 88° C. for 40 minutes. Then NaOH solution was added to adjust the pH to 8.0-8.5. At last, 8.20 g of CoatOSil MP200 silane oligomer were post added slowly.

Comp Ex 5 Aqueous Polymer Composition

A monomer emulsion (ME) was prepared by mixing 450 g of DI water, 60 g of P-12A, 60 g of AR-1025, 697.17 g of MMA, 109.42 g of 2-EHA, 721.21 g of EA, 22.29 g of MPEG-1005MA and 16.97 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.0 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate dissolved in 100 g of DI water in 120 minutes. When the ME feed was completed, the reaction was maintained at 88° C. for 40 minutes. Then NaOH solution was added to adjust the pH to 8.0-8.5. At last, 8.20 g of CoatOSil MP200 silane oligomer were post added slowly.

Ex 2 Aqueous Polymer Composition

The aqueous polymer composition of Ex 2 was prepared according to the same procedure as Ex 1 above, except that the monomer emulsion used in Ex 2 was prepared by mixing 450 g of DI water, 60 g of P-12A, 60 g of UCAN-5, 697.17 g of MMA, 109.42 g of 2-EHA, 721.21 g of EA, 22.29 g of MPEG-1005MA and 16.97 g of MAA.

Ex 3 Aqueous Polymer Composition

The aqueous polymer composition of Ex 3 was prepared according to the same procedure as Ex 1 above, except that the monomer emulsion used in Ex 3 was prepared by mixing 450 g of DI water, 60 g of P-12A, 60 g of UCAN-7, 697.17 g of MMA, 109.42 g of 2-EHA, 721.21 g of EA, 22.29 g of MPEG-1005MA and 16.97 g of MAA.

Ex 4 Aqueous Polymer Composition

The aqueous polymer composition of Ex 4 was prepared according to the same procedure as Ex 1 above, except that the monomer emulsion used in Ex 4 was prepared by mixing 450 g of DI water, 60 g of P-12A, 6.67 g of PP-7025, 697.17 g of MMA, 109.42 g of 2-EHA, 721.21 g of EA, 22.29 g of MPEG-1005MA and 16.97 g of MAA.

Ex 5 Aqueous Polymer Composition

The aqueous polymer composition of Ex 5 was prepared according to the same procedure as Ex 1 above, except that the monomer emulsion used in Ex 5 was prepared by mixing 450 g of DI water, 60 g of P-12A, 25.71 g of PP-7025, 697.17 g of MMA, 109.42 g of 2-EHA, 721.21 g of EA, 22.29 g of MPEG-1005MA and 16.97 g of MAA.

Ex 6 Aqueous Polymer Composition

The aqueous polymer composition of Ex 6 was prepared according to the same procedure as Ex 1 above, except that the monomer emulsion used in Ex 6 was prepared by mixing 450 g of DI water, 60 g of P-12A, 140 g of PP-7025, 697.17 g of MMA, 109.42 g of 2-EHA, 721.21 g of EA, 22.29 g of MPEG-1005MA and 16.97 g of MAA.

Ex 7 Aqueous Polymer Composition

The aqueous polymer composition of Ex 7 was prepared according to the same procedure as Ex 1 above, except that the monomer emulsion used in Ex 7 was prepared by mixing 450 g of DI water, 60 g of P-12A, 540 g of PP-7025, 697.17 g of MMA, 109.42 g of 2-EHA, 721.21 g of EA, 22.29 g of MPEG-1005MA and 16.97 g of MAA.

Ex 8 Aqueous Polymer Composition

A monomer emulsion (ME) was prepared by mixing 450 g of DI water, 60 g of P-12A, 60 g of PP-7025, 697.17 g of MMA, 109.42 g of 2-EHA, 721.21 g of EA, 22.29 g of MPEG-1005MA and 16.97 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.0 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate dissolved in 100 g of DI water in 120 minutes. When the ME feed was completed, the reaction was maintained at 88° C. for 40 minutes. Then NaOH solution was added to adjust the pH to 8.0-8.5. At last, 8.20 g of Silquest A-187 silane were post added slowly.

Ex 9 Aqueous Polymer Composition

A monomer emulsion (ME) was prepared by mixing 450 g of DI water, 60 g of P-12A, 60 g of PP-7025, 697.17 g of MMA, 109.42 g of 2-EHA, 721.21 g of EA, 22.29 g of MPEG-1005MA and 16.97 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.0 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate dissolved in 100 g of DI water in 120 minutes. When the ME feed was completed, the reaction was maintained at 88° C. for 40 minutes. Then NaOH solution was added to adjust the pH to 8.0-8.5. At last, 8.20 g of Silquest A-171 silane were post added slowly.

Comp Ex 6 Aqueous Polymer Composition

The aqueous polymer composition of Comp Ex 6 was prepared according to the same procedure as Ex 1 above, except that the monomer emulsion used in Comp Ex 6 was prepared by mixing 450 g of DI water, 60 g of P-12A, 60 g of UCAN-6, 697.17 g of MMA, 109.42 g of 2-EHA, 721.21 g of EA, 22.29 g of MPEG-1005MA and 16.97 g of MAA.

Comp Ex 7 Aqueous Polymer Composition

The aqueous polymer composition of Comp Ex 7 was prepared according to the same procedure as Ex 1 above, except that the monomer emulsion used in Comp Ex 7 was prepared by mixing 450 g of DI water, 60 g of P-12A, 37.5 g of COPS-3, 697.17 g of MMA, 109.42 g of 2-EHA, 721.21 g of EA, 22.29 g of MPEG-1005MA, and 16.97 g of MAA.

Comp Ex 8 Aqueous Polymer Composition

The aqueous polymer composition of Comp Ex 8 was prepared according to the same procedure as Ex 1 above, except that the monomer emulsion used in Comp Ex 8 was prepared by mixing 450 g of DI water, 60 g of P-12A, 60 g of UCAN-9, 697.17 g of MMA, 109.42 g of 2-EHA, 721.21 g of EA, 22.29 g of MPEG-1005MA and 16.97 g of MAA.

Comp Ex 9 Aqueous Polymer Composition

The aqueous polymer composition of Comp Ex 9 was prepared according to the same procedure as Ex 1 above, except that the monomer emulsion used in Comp Ex 9 was prepared by mixing 450 g of DI water, 60 g of P-12A, 15 g of PEM, 697.17 g of MMA, 109.42 g of 2-EHA, 721.21 g of EA, 22.29 g of MPEG-1005MA and 16.97 g of MAA.

Comp Ex 10 Aqueous Polymer Composition

The aqueous polymer composition of Comp Ex 10 was prepared according to the same procedure as Ex 1 above, except that the monomer emulsion used in Comp Ex 10 was prepared by mixing 450 g of DI water, 60 g of P-12A, 15 g of PAM-200, 697.17 g of MMA, 109.42 g of 2-EHA, 721.21 g of EA, 22.29 g of MPEG-1005MA and 16.97 g of MAA.

Comp Ex 11 Aqueous Polymer Composition

A monomer emulsion (ME) was prepared by mixing 450 g of DI water, 60 g of P-12A, 60 g of PP-7025, 697.17 g of MMA, 109.42 g of 2-EHA, 721.21 g of EA, 22.29 g of MPEG-1005MA and 16.97 g of MAA.

In a 5-liter, four necked round bottom flask equipped with a paddle stirrer, a thermometer, a nitrogen inlet and a reflux condenser, 700 g of DI water was added and heated to 88° C. under nitrogen atmosphere with stirring. 5.0 g of Fes-32 and 59.6 g of ME were then added into the flask, quickly followed by 4.68 g of sodium persulfate dissolved in 28.08 g of DI water. The remaining ME was added into the flask while co-feeding 1.56 g of sodium persulfate dissolved in 100 g of DI water in 120 minutes. When the ME feed was completed, the reaction was maintained at 88° C. for 40 minutes. Then NaOH solution was added to adjust the pH to 8.0-8.5.

All the above obtained aqueous polymer compositions had a measured particle size of about 130 nm and a solids content of about 47%.

Coating Composition

Coating compositions were prepared based on formulations listed in Table 1. The as prepared aqueous polymer compositions (Exs 1-9 and Comp Exs 1-11) were used as binders for preparing each coating composition, according to formulations given in Table 2. Ingredients for grind were mixed using a high speed Cowles disperser. Then ingredients for letdown were added and mixed by a conventional agitator. The obtained coating compositions were tested according to the test methods described above and results are given in Table 2. All the coating compositions had VOCs lower than 5 g/L as measured according to the GB18582-2008 method.

TABLE 1

| | Typical zero VOC paint formulation | | |
|---|---|---|---|
| Ingredients | Chemical description | Supplier | Gram |
| Grind | | | |
| Water | | | 197.00 |
| Natrosol 250 HBR | hydroxyethyl cellulose (HEC) | Ashland Company | 2.00 |

TABLE 1-continued

Typical zero VOC paint formulation

| Ingredients | Chemical description | Supplier | Gram |
|---|---|---|---|
| Sodium hydroxide (15%) | | Sinopharm Chemical Reagent Co., Ltd. | 1.50 |
| Orotan 1288 | dispersant | The Dow Chemical Company | 6.00 |
| 15-s-40 | surfactant | The Dow Chemical Company | 3.00 |
| Rhodoline FT-100 | anti-freezer | Solvay Company | 4.00 |
| Nopco NXZ | defoamer | San Nopco Ltd. | 3.00 |
| DB-80 | kaolin | Guangfu Building Materials Group | 70.00 |
| MCP-902 | kaolin | Guangzhou Lingsheng Chemical Co. | 50.00 |
| CC-700 | calcium carbonate | Guangfu Building Materials Group | 50.00 |
| Celite 499 | diatomite | IRI New Materials Ltd. | 9.00 |
| Ti-Pure R-706 | titanium dioxide | DuPont Company | 200.00 |
| Kathon LX | biocide | The Dow Chemical Company | 1.00 |
| Ropaque Ultra E | Opaque polymer | The Dow Chemical Company | 40.00 |
| LetDown | | | |
| Water | | | 15.74 |
| Binder | | | 320.00 |
| Coasol 290 Plus | Coalescent | Chemoxy International Ltd. | 24.36 |
| Acrysol TT-935 | thickener | The Dow Chemical Company | 3.40 |
| Total LetDown | | | 363.500 |
| Total | | | 1000.0 |

As shown in Table 2, binders comprising a polymer obtained from the reactive allyl alkoxylated phosphate monomers having 3-5 PO units, in combination with the P-12A phosphate surfactant and the functional silanes (Exs 1-9 binders) surprisingly provided coatings with good stain resistance (stain removal score of 60~65) while maintaining good F/T stability and anti-clogging properties for zero VOC coating compositions.

In contrast, when combining A-19 surfactant with the polymer having structural units of the PP-7025 reactive phosphate monomer (Comp Ex 1 binder), the stain removal score of the resultant coating was very low (~46). When using the P-12A surfactant (Comp Ex 2 binder), the PE3016 phosphate surfactant (Comp Ex 3 binder), or other reactive alkoxylate sulfate surfactants (SR-1025 or AR-1025) (Comp Exs 4 and 5 binders), the resultant binders provided coatings with poor stain removal performance. Binders obtained from the reactive ally alkoxylate phosphate monomer having ethylene oxide units but no propylene oxide units (Comp Exs 6 and 7 binders) provided coatings with poor stain resistance and unbalanced F/T stability and anti-clogging properties. The binder obtained from the ally alkoxylate phosphate monomer having 8 PO units (Comp Ex 8 binder) failed the F/T stability test. The use of reactive methacrylate phosphate monomer (Comp Exs 9 and 10 binders) also resulted in poor stain resistance, F/T stability and anti-clogging performance properties of coatings. The binder that did not contain any functional silane (Comp Ex 11 binder) provided poor stain resistance as indicated by a stain removal score <60 in the zero VOC coating composition.

TABLE 2

Binder composition and Coating performance

| | Binder Composition | | | | | Coating Performance | | |
|---|---|---|---|---|---|---|---|---|
| Coating | Binder No. | Surfactant | Phosphate monomer (M1) | M1/Surfactant in ME Ratio | Functional Silane | F/T (−6° C.) | Stain removal score | Brush Clogging |
| Coating 1 | Ex 1 | P-12A | PP-7025 (3 PO) | 1:1 | MP200 | Pass | 62 | Pass |
| Coating 2 | Ex 2 | P-12A | UCAN-5 (5 PO) | 1:1 | MP200 | Pass | 62 | Pass |
| Coating 3 | Ex 3 | P-12A | UCAN-7 (4 EO, 5 PO) | 1:1 | MP200 | Pass | 62 | Pass |
| Coating 4 | Ex 4 | P-12A | PP-7025 | 1:9 | MP200 | Pass | 60 | Pass |
| Coating 5 | Ex 5 | P-12A | PP-7025 | 3:7 | MP200 | Pass | 60 | Pass |
| Coating 6 | Ex 6 | P-12A | PP-7025 | 7:3 | MP200 | Pass | 65 | Pass |
| Coating 7 | Ex 7 | P-12A | PP-7025 | 9:1 | MP200 | Pass | 65 | Pass |
| Coating 8 | Ex 8 | P-12A | PP-7025 | 1:1 | A-187 | Pass | 65 | Pass |
| Coating 9 | Ex 9 | P-12A | PP-7025 | 1:1 | A-171 | Pass | 65 | Pass |
| Comp Coating 1 | Comp Ex 1 | A-19 | PP-7025 | 1:0 | MP200 | Pass | 46 | Pass |
| Comp Coating 2 | Comp Ex 2 | P-12A | No | 0:1 | MP200 | Pass | 53 | Pass |
| Comp Coating 3 | Comp Ex 3 | PE3016 | No | 0:1 | MP200 | Pass | 48 | Pass |

TABLE 2-continued

Binder composition and Coating performance

| Coating | Binder No. | Surfactant | Phosphate monomer (M1) | M1/Surfactant in ME Ratio | Functional Silane | F/T (−6° C.) | Stain removal score | Brush Clogging |
|---|---|---|---|---|---|---|---|---|
| Comp Coating 4 | Comp Ex 4 | SR-1025 + P-12A | No | 0:1 | MP200 | Pass | 53 | Pass |
| Comp Coating 5 | Comp Ex 5 | AR-1025 + P-12A | No | 0:1 | MP200 | Pass | 48 | Pass |
| Comp Coating 6 | Comp Ex 6 | P-12A | UCAN-6 (5 EO) | 1:1 | MP200 | Fail | 53 | Pass |
| Comp Coating 7 | Comp Ex 7 | P-12A | COPS-3 (4 EO) | 1:1 | MP200 | Pass | 55 | Fail |
| Comp Coating 8 | Comp Ex 8 | P-12A | UCAN-9 (8 PO) | 1:1 | MP200 | Fail | 60 | Pass |
| Comp Coating 9 | Comp Ex 9 | P-12A | PEM (1 EO) | 1:1 | MP200 | Pass | 57 | Fail |
| Comp Coating 10 | Comp Ex 10 | P-12A | PAM-200 (5 PO) | 1:1 | MP200 | Fail | 55 | Fail |
| Comp Coating 11 | Comp Ex 11 | P-12A | PP-7025 | 1:1 | No | Pass | 58 | Pass |

What is claimed is:

1. An aqueous polymer composition, comprising,
(i) a polymer comprising, based on the weight of the polymer, from 0.1% to 10% by weight of structural units of an allyl alkoxylated phosphate monomer having the structure of formula (I),

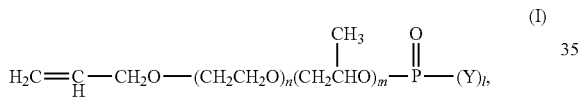

wherein m is from 2 to 5, n is from 0 to 10, l is 1 or 2, and Y is —OH or —O⁻M⁺, where M is a metal ion or ammonium ion;
(ii) a functional silane selected from an epoxy functional polysiloxane oligomer, an epoxy functional silane compound, an ethylenically unsaturated compound carrying at least one alkoxysilane functionality, or mixtures thereof; and
(iii) a phosphate surfactant having the structure of formula (V),

wherein R is a $C_8$-$C_{30}$ alkyl, AO is an alkoxylated group, b is from 1 to 2, a is from 1 to 30, and N⁺ is a metal ion or ammonium ion.

2. The aqueous polymer composition of claim 1, wherein, in formula (I), m is from 3 to 5, n is from 0 to 5, and Y is —O⁻M⁺, where M is a metal ion or ammonium ion.

3. The aqueous polymer composition of claim 1, wherein the polymer comprises, based on the weight of the polymer, from 0.5% to 3% by weight of structural units of the allyl alkoxylated phosphate monomer.

4. The aqueous polymer composition of claim 1, wherein the epoxy functional polysiloxane oligomer has the following structure (III),

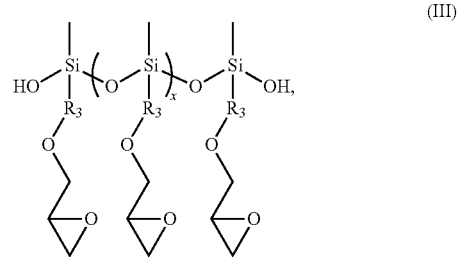

wherein x is from 0 to 14, and $R_3$ is —$CH_2CH_2CH_2$—.

5. The aqueous polymer composition of claim 1, wherein the functional silane is selected from the group consisting of 3-glycidyloxypropyl trimethoxysilane, 3-glycidyloxypropyl triethoxysilane, 3-glycidyloxypropyl methyldiethoxysilane, 3-glycidyloxypropyl methyldimethoxysilane, vinyltrialkoxysilanes, alkylvinyldialkoxysilanes, and (meth)acryloxyalkyltrialkoxysilanes.

6. The aqueous polymer composition of claim 1, wherein the functional silane is present in an amount of from 0.1% to 3% by weight, based on the weight of the polymer.

7. The aqueous polymer composition of claim 1, wherein the polymer further comprises, based on the weight of the polymer, from 0.1% to 5% by weight of structural units of an ethylenically unsaturated alkoxylated (meth)acrylate monomer.

8. The aqueous polymer composition of claim 1, comprising from 0.1% to 5% by weight of the phosphate surfactant, based on the weight of the polymer.

9. An aqueous coating composition having a VOCs content of 5 g/L or less, comprising the aqueous polymer composition of claim 1, and at least one component selected from the group consisting of a dispersant, a coalescent, a wetting agent, a thickener, a defoamer, a pigment, and an extender.

* * * * *